(12) United States Patent
Leveille et al.

(10) Patent No.: US 11,181,103 B2
(45) Date of Patent: Nov. 23, 2021

(54) MULTI-STAGE DISPLACEMENT PUMP

(71) Applicant: Waters Technologies Corporation, Milford, MA (US)

(72) Inventors: Wade P. Leveille, Douglas, MA (US); Jacob N. Fairchild, Upton, MA (US); Jeffrey Musacchio, Sharon, MA (US); Joseph D. Michienzi, Plainville, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 157 days.

(21) Appl. No.: 16/444,180

(22) Filed: Jun. 18, 2019

(65) Prior Publication Data

US 2019/0383277 A1 Dec. 19, 2019

Related U.S. Application Data

(60) Provisional application No. 62/686,961, filed on Jun. 19, 2018.

(51) Int. Cl.
| | |
|---|---|
| *F04B 25/00* | (2006.01) |
| *F16K 15/03* | (2006.01) |
| *F04B 25/02* | (2006.01) |
| *F04B 13/00* | (2006.01) |
| *F04B 15/02* | (2006.01) |

(52) U.S. Cl.
CPC .............. *F04B 25/00* (2013.01); *F04B 13/00* (2013.01); *F04B 25/02* (2013.01); *F16K 15/035* (2013.01); *F04B 2015/026* (2013.01)

(58) Field of Classification Search
CPC ...... F04B 11/0075; F04B 13/00; F04B 17/03; F04B 1/02; F04B 2015/026; F04B 23/06; F04B 25/00; F04B 25/02
See application file for complete search history.

(56) References Cited

U.S. PATENT DOCUMENTS

| | | | |
|---|---|---|---|
| 4,705,460 A * | 11/1987 | Braun | F02B 71/04 |
| | | | 123/46 SC |
| 5,464,330 A * | 11/1995 | Prince | F04B 1/053 |
| | | | 417/245 |
| 5,918,580 A * | 7/1999 | Hennrich | F02M 25/089 |
| | | | 123/520 |

(Continued)

*Primary Examiner* — Dominick L Plakkoottam
(74) *Attorney, Agent, or Firm* — Schmeiser, Olsen & Watts LLP; William G. Guerin (57) ABSTRACT

Described is a multi-stage pump having at least two stages. The multi-stage pump includes a first pump stage and a second pump stage each having a chamber of different diameter and volume. The multi-stage pump also includes a plunger having first and second plunger sections. The first plunger section has a first plunger diameter, a first end configured for coupling to a drive mechanism, and a second end opposite to the first end. The second plunger section has a second plunger diameter that is less than the first plunger diameter, a third end in contact with the second end of the first plunger, and a fourth end opposite the third end. Movement of the plunger produces a displacement volume for the first chamber that is different than a displacement volume produced for the second chamber. The multi-stage pump can be configured in different operational modes to provide different flow rates.

12 Claims, 8 Drawing Sheets

(56) References Cited

U.S. PATENT DOCUMENTS

| | | | | |
|---|---|---|---|---|
| 6,712,587 B2* | 3/2004 | Gerhardt | ............... | G01N 30/22 |
| | | | | 417/390 |
| 7,311,502 B2* | 12/2007 | Gerhardt | ............... | F04B 49/065 |
| | | | | 417/390 |
| 7,459,092 B2* | 12/2008 | Johnson | ............... | B01D 61/18 |
| | | | | 210/770 |
| 7,588,423 B2* | 9/2009 | Takao | ............... | F04B 11/0075 |
| | | | | 417/244 |
| 8,714,312 B2* | 5/2014 | Tiner | ............... | B66B 5/06 |
| | | | | 187/285 |
| 2011/0113866 A1* | 5/2011 | Finlay | ............... | G01N 30/6095 |
| | | | | 73/61.52 |
| 2012/0282114 A1* | 11/2012 | Cannata | ............... | F04B 35/008 |
| | | | | 417/53 |
| 2013/0139682 A1* | 6/2013 | Chagaris | ............... | F04B 15/02 |
| | | | | 92/153 |
| 2015/0361970 A1* | 12/2015 | White | ............... | F04B 27/005 |
| | | | | 417/53 |
| 2019/0331103 A1* | 10/2019 | Matsumoto | ............... | F04B 25/02 |

\* cited by examiner

MULTI-STAGE DISPLACEMENT PUMP

RELATED APPLICATIONS

This application claims the benefit of U.S. Provisional Application No. 62/686,961, filed on Jun. 19, 2018, and titled "MULTI-STAGE DISPLACEMENT PUMP," the entirety of which is incorporated by reference herein.

FIELD OF THE INVENTION

The invention relates generally to a positive displacement pump that can provide a wide range of volumetric flow rates with good flow rate resolution. More particularly, the invention relates to a positive displacement pump with a plunger formed of plunger sections having different plunger diameters.

BACKGROUND

High performance liquid chromatography (HPLC) systems and ultra-high performance liquid chromatography (UHPLC) systems often employ one or more positive displacement type pumps. The flow rate capability of the pump is determined by multiple pump parameters, including the plunger diameter, pump stroke length and the pump stroke frequency.

For most chromatographic systems, flow rate resolution is an important factor. For example, for large scale analysis, the diameter of an ideal plunger may be several times that of an ideal plunger for small-scale analysis. Consequently, multiple pump heads or separate pump systems may be required to accommodate both small-scale and large-scale analyses. Such configurations result in higher cost and complexity for the chromatographic system.

SUMMARY

In one example, a multi-stage pump includes a first pump stage, a second pump stage and a plunger. The first pump stage has a first chamber having a first chamber diameter and a first chamber volume. The second pump stage has a second chamber having a second chamber diameter and a second chamber volume. The first and second chambers are coaxial. The first chamber diameter and the first chamber volume are greater than the second chamber diameter and the second chamber volume, respectively. The plunger includes a first plunger section and a second plunger section. The first plunger section has a first plunger diameter, a first end configured for coupling to a drive mechanism, and a second end opposite to the first end. The first plunger section is at least partially disposed in the first chamber. The second plunger section has a second plunger diameter that is less than the first plunger diameter, a third end in contact with the second end of the first plunger, and a fourth end opposite to the third end. The second plunger section is at least partially disposed in the second chamber. A linear motion of the plunger produces a displacement volume for the first chamber that is different than a displacement volume produced for the second chamber.

The first and second plunger sections may be formed as a single integral plunger having the first plunger diameter along a first length and the second plunger diameter along a second length. Alternatively, the first and second plunger sections may be discrete plunger sections.

The multi-stage pump may further include a plunger spring disposed between the fourth end of the second plunger section and a closed end of the second chamber.

The multi-stage pump may further include a first inlet channel and a second inlet channel in fluid communication with the first chamber and the second chamber, respectively, and a first outlet channel and a second outlet channel in fluid communication with the first chamber and the second chamber, respectively. For each of the inlet channels, a parallel fluid path configuration of an inlet check valve and a bypass valve may be disposed on the inlet channel, wherein the inlet check valve enables a forward flow of a liquid during an intake stroke and prevents a reverse flow of the liquid during a delivery stroke. The multi-stage pump may further include, for each of the inlet channels, a controllable valve to enable and disable a flow of fluid through the controllable valve. The multi-stage pump may further include a control module in communication with each of the controllable valves, wherein the control module provides a plurality of control signals to selectively enable and disable the flow of the fluid through the controllable valves. For at least one of the first and second chambers during the delivery stroke, the bypass valve for the chamber may be in a closed state so that a reverse flow of the liquid passes through the bypass valve. The bypass valves may be remotely controllable and the multi-stage pump may further include a control module in communication with each of the bypass valves to independently configure each of the bypass valves in one of an open state and a close state. The multi-stage pump may further include a check valve disposed in each of the outlet channels, wherein the check valve is configured to prevent a forward flow of a liquid through the check valve during an intake stroke and to enable the forward flow of the liquid through the check valve during a delivery stroke.

The multi-stage pump may further include at least one additional chamber and at least one additional plunger section. Each of the additional chambers has a chamber diameter that is less than the first chamber diameter and the second chamber diameter, and different from the chamber diameter of any other additional chambers. Each of the additional chambers has a chamber volume that is less than the first chamber volume and the second chamber volume, and different from the chamber volume of the other additional chambers.

The first plunger diameter may not exceed 2 mm. The first plunger diameter may exceed 10 mm.

The multi-stage pump may further include a thermal control device in thermal communication with at least one of the first and second pump stages.

In another example, a multi-stage pump includes a first pump stage, a second pump stage and a plunger. The first pump stage includes a first chamber having a first chamber diameter and a first chamber volume, and a first inlet channel and a first outlet channel each in communication with the first chamber. The second pump stage includes a second chamber having a second chamber diameter and a second chamber volume, and a second inlet channel and a second outlet channel each in communication with the second chamber, wherein the first and second chambers are coaxial. The plunger includes a first plunger section and a second plunger section. The first plunger section has a first plunger diameter, a first end configured for coupling to a drive mechanism, and a second end opposite to the first end. The first plunger section is at least partially disposed in the first chamber. The second plunger section has a second plunger diameter that is less than the first plunger diameter, a third end in contact with the second end of the first plunger, and a fourth end opposite to the third end. The second plunger section is at least partially disposed in the second chamber. A linear motion of the plunger produces a displacement volume for the first chamber that is different than a displacement volume produced for the second chamber.

The multi-stage pump may further include, for each of the first and second inlet channels, a parallel fluid path configuration of an inlet check valve and a bypass valve disposed in the respective inlet channel. The inlet check valve enables a forward flow of a liquid during an intake stroke and prevents a reverse flow of the liquid during a delivery stroke.

The multi-stage pump may further include a check valve disposed in each of the first and second outlet channels. The check valve is configured to prevent a forward flow of a liquid through the check valve during an intake stroke and to enable the forward flow of the liquid through the check valve during a delivery stroke.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the technology.

DETAILED DESCRIPTION

The present teaching will now be described in more detail with reference to examples thereof as shown in the accompanying drawings. While the present teaching is described in conjunction with various embodiments and examples, it is not intended that the present teaching be limited to such descriptions. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure.

In chromatography systems, the flow rate of the mobile phase is an important parameter along with the flow rate resolution. When using a chromatography system for small scale analysis, the pump may have a plunger diameter of 2 mm or less. When using the same chromatography system for larger scale analysis, the plunger diameter may be much greater, possibly exceeding 10 mm in diameter to allow for delivery of fluid at greater flow rates. Because of these requirements, multiple pumps may be required. Alternatively, the pump head, plunger and other pump components can be removed and replaced to achieve a different flow rate with acceptable flow rate resolution.

In brief overview, the examples described below are directed to a multi-stage pump having at least a first pump stage and a second pump stage each having a chamber in coaxial arrangement to the other chamber. The first chamber has a chamber diameter and a chamber volume that are greater than a chamber diameter and a chamber volume of the second chamber. The multi-stage pump also includes a plunger having a first plunger section and a second plunger section. The first plunger section has a first plunger diameter, a first end configured for coupling to a drive mechanism, and a second end opposite to the first end. The second plunger section has a second plunger diameter that is less than the first plunger diameter, a third end in contact with the second end of the first plunger, and a fourth end opposite to the third end. The first plunger section is at least partially disposed in the first chamber and the second plunger section is at least partially disposed in the second chamber. A linear motion of the plunger produces a displacement volume for the first chamber that is different than a displacement volume produced for the second chamber. The multi-stage pump can be configured in different operational modes to provide different flow rates.

In the various examples of a multi-stage pump described below, the pump may be used to deliver fluid across a wide range of flow rates and accommodate required flow rate resolutions (e.g., less than 1% variation in flow rate). As used herein, flow rate means the volumetric flow rate of a fluid unless otherwise stated. The multi-stage pump can be used in applications utilizing incompressible and/or compressible fluids (e.g., supercritical fluids). When used with compressible fluids, one or more of the stages may be chilled so that less compression occurs during a pump stroke. For example, a thermal control device, such as a Peltier device, may be provided in thermal communication with at least one of the pump stages. Optionally, a booster pump may be used to compress the fluid upstream from the multi-stage pump to enable a more accurately controlled flow rate.

Advantageously, only a single multi-stage pump is required whereas, for conventional pumps, replacement of a pump may be necessary to reconfigure a pump between a low flow rate pump and a high flow rate pump. The number of stages and the diameter of the plunger section in each stage can be selected to achieve a desired flow resolution. The multi-stage pump may be particularly beneficial in a solvent delivery system for a liquid chromatography system for which operation under a wide range of flow rates is desired. For example, the multi-stage pump may be quickly reconfigured, either manually or by activation according to control signals issued from a control module. The result may be a decreased cost with respect to a conventional reconfiguration which requires the purchase of two or more single stage pumps.

In one example, a pumping system may include two multi-stage pumps arranged in a parallel pumping configuration. In another example, a pump system may include two multi-stage pumps arranged in a serial configuration, such as in a primary and accumulator configuration as known in the art. Alternatively, the primary pump may be configured with a conventional single diameter plunger and chamber while the accumulator pump may be a multi-stage pump.

Figure 1:
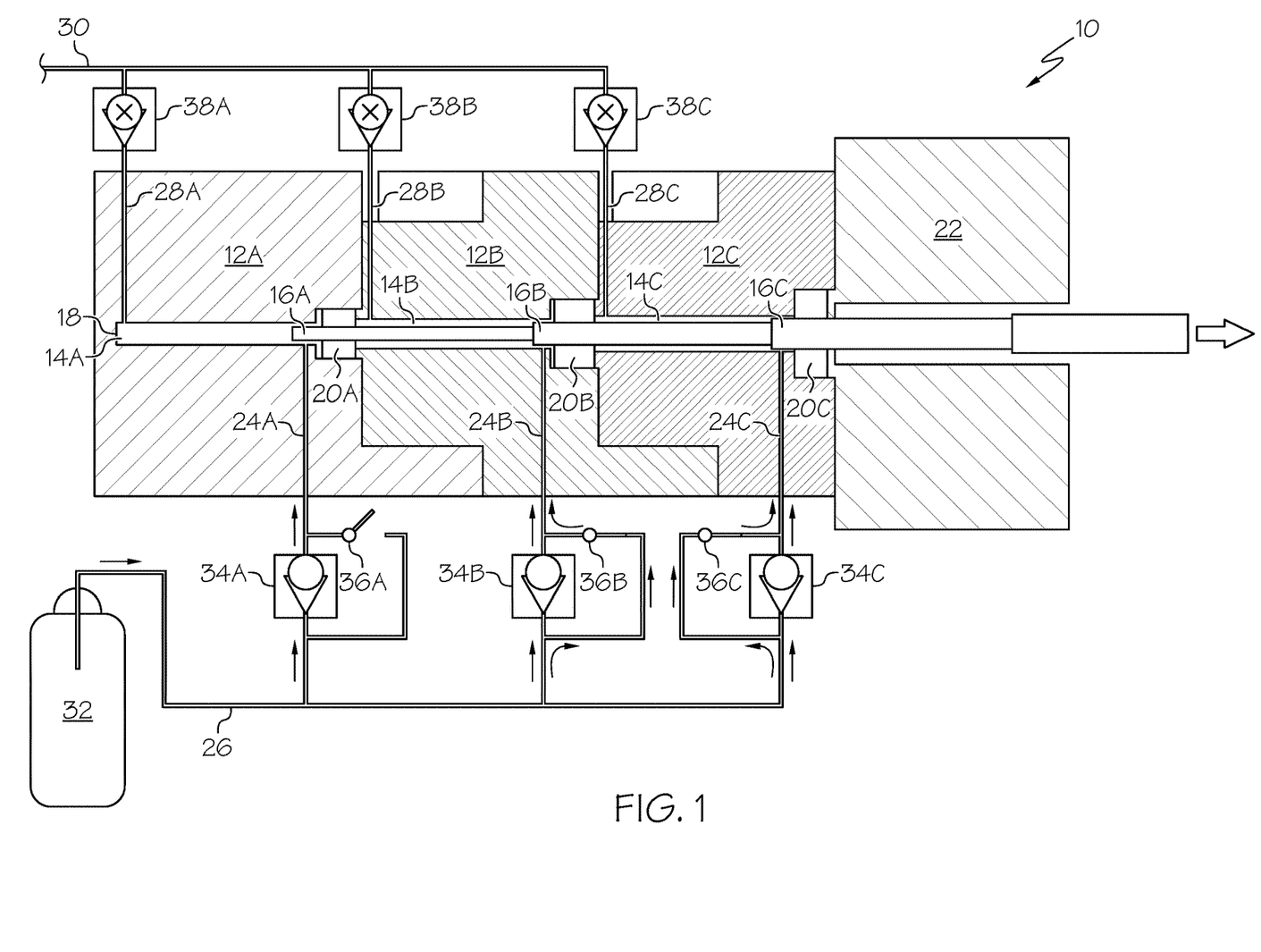
FIG. 1 is a schematic view of an example of a multi-stage pump configured for a low flow rate operational mode during an intake stroke.

FIG. 1 is a schematic view of a multi-stage pump 10 for a pump having three pump stages 12A, 12B and 12C. The stages 12 may be made from a metallic material (e.g., stainless steel) or non-metallic material, depending on pressure requirements. Each stage 12 includes a chamber (bore) 14A, 14B and 14C in which at least a portion of a multi-section plunger 16 is disposed. Each chamber 14 has a smaller diameter than the chamber to its right in the figure. The plunger diameter for plunger section 16A is less than the plunger diameter for plunger section 16B which is less than the plunger diameter for plunger section 16C. The plunger 16 may be made of stainless steel with a titanium nitride coating, sapphire or a ceramic material. The plunger sections may be fabricated as a single integral element having different diameters along its length. Conversely, the plunger 16 may be formed of discrete (i.e., separate) plunger sections where each plunger section has a constant diameter along its length. In one example, a plunger spring may be positioned in the smallest chamber 14A between its closed end 18 and the tip of the smallest plunger section 16A so that an axial force is imparted to the plunger 16. In one example, the plunger spring is a compression spring. The plunger spring may be made from stainless steel or another material that is compatible with the type of fluid being pumped. The plunger spring forces the smallest plunger element 16A against the next plunger element 16B which in turn is forced against the largest plunger element 16C. This configuration allows the plunger 16 to operate properly with some lateral misalignment of the plunger elements with respect to each other. Each chamber 14 is formed in an independent pump stage, as illustrated, and the pump stages subsequently attached to each other such that the chambers 14 are coaxially aligned. The manner of attachment preferably allows for future servicing to be performed. For example, subsequent detachment of the pump stages should enable access to the fluidic seals for replacement. The largest stage 12C is attached to a support plate 22 that can be secured to a pump drive mechanism (not shown) that controls the reciprocating linear motion of the plunger 16.

A high-pressure seal 20A, 20B and 20C is disposed in a gland at the open end of each stage 12 and provides a fluid-tight seal between adjacent chambers 14. In one example, the outer diameter of the seal 20 provides a seal against a surface of the gland and the inner diameter of the seal provides a seal against the respective plunger section. For an HPLC system the pressure in the chambers 14 may exceed 40 MPa (6,000 psi) and for a UHLC system the pressure in the chambers 14 may exceed 125 MPa (18,000 psi). The seals 20 should accommodate the maximum pressure differentials that may occur between adjacent chambers 14 when one is online and the other is offline.

Each stage 12 includes an inlet channel 24A, 24B and 24C in fluid communication with a pump inlet channel 26 and a respective chamber 14, and an outlet channel 28A, 28B and 28C in fluid communication with the respective chamber 14 and a pump outlet channel 30. The pump inlet channel 26 may be in fluid communication with a source 32 of a single solvent. Alternatively, the pump inlet channel 26 may conduct a mixture of two or more solvents such that the fluid delivered to the multi-stage pump may have a gradient composition as is known in the art. In one example, multiple solvent flows may be modulated by a gradient proportioning valve that provides a solvent flow having a gradient composition.

An inlet check valve 34 is disposed in the fluid path between each inlet channel 24 and the pump inlet channel 26 to permit a forward flow of fluid to the chamber 14 through the inlet check valve 34 during an intake stroke and to prevent a reverse flow of fluid from the chamber 14 through the inlet check valve 34 during a delivery stroke. An outlet check valve 38 is disposed in the fluid path between each outlet channel 28 and the pump outlet channel 30 to permit a forward flow of fluid from the chamber 14 to the pump outlet channel 30 and to prevent a reverse flow of fluid from the pump outlet channel 30 to the chamber 14. In the figure and subsequent figures, an "X" inside the circle of the check valve symbol designates that the check valve is in a state in which fluid does not flow through the valve.

A bypass valve 36 is disposed between each inlet channel 24 and the pump inlet channel 26, and is arranged in a parallel flow path to the flow path having the inlet check valve 34. Each bypass valve 36 is configured to either allow or prevent pressurization of the corresponding chamber 14. The bypass valve 36 can be manually or automatically configured in an open state in which the flow of fluid is prevented from flowing through the valve or configured in a closed state in which fluid is allowed to flow (or be "conducted") through the valve, respectively. As illustrated in FIG. 1, bypass valve 36A is in an open state and bypass valves 36B and 36C are in a closed state and therefore only flow from chamber 14A is delivered by the multi-stage pump 10.

Figure 2:
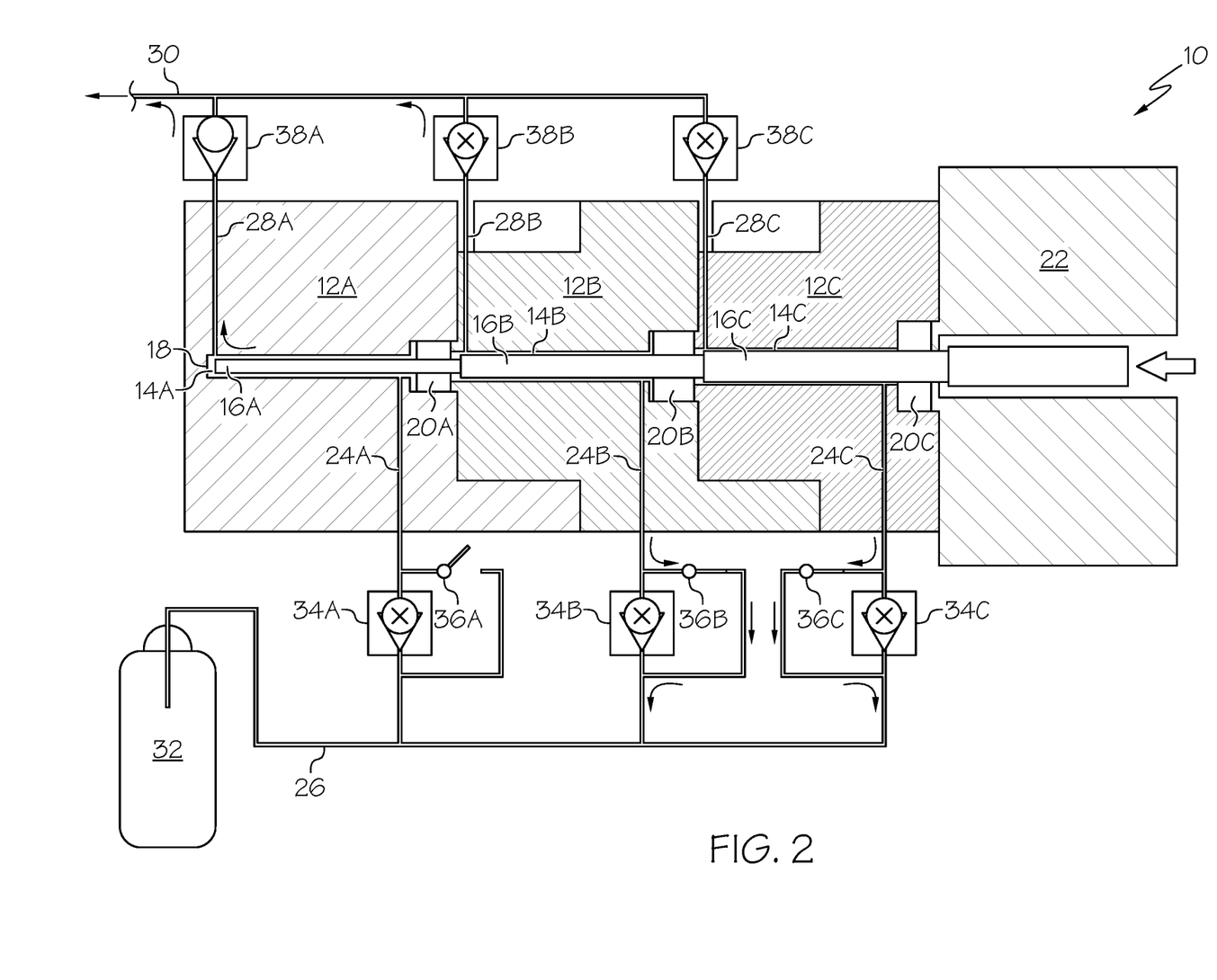
FIG. 2 shows the multi-stage pump of FIG. 1 during a delivery stroke.

The multi-diameter plunger 16 is coupled at the larger diameter end to a pump drive used to impart a reciprocating linear motion to the plunger 16. For example, the pump drive mechanism may include a rotary mechanism, gears, ball screws, cam and/or other components used to generate the reciprocating linear motion along the axis of the coaxially-arranged chambers 14. The plunger is shown retracted, i.e., moved from left to right in FIG. 1, during an intake stroke to cause each chamber 14 to fill with fluid as described further below. As illustrated, the plunger 16 is near the end of the range of travel of the intake stroke. Conversely, the plunger 16 is moved from right to left during a delivery stroke (see FIG. 2 showing the plunger nearing the end of the range of travel) to cause fluid to be expelled from each chamber 14. In the illustrated configuration, only the fluid expelled from chamber 14A passes to the pump outlet channel 30 due to the open state of bypass valve 34A. Fluid expelled from chambers 14B and 14C during the delivery stroke passes back through bypass valves 34B and 34C, respectively, to the pump inlet channel 26.

Generally, the fluid volume expelled from a pump stage 12 is greater for a non-compressible fluid than for a compressible fluid as a portion of the delivery stroke results in a compression of the compressible fluid. The volume of an incompressible fluid drawn into or expelled from a pump stage 12 is determined, at least in part, according to the difference of the unoccupied volume of the chamber 14 at the end of an intake stroke and the unoccupied volume of the chamber at the end of a delivery stroke. More specifically, the displacement volumes of the three stages 12 are given by:

$$DV_A = PA_A * S$$

$$DV_B = (PA_B - PA_A) * S$$

$$DV_C = (PA_C - PA_B) * S$$

where $PA_A$, $PA_B$ and $PA_C$ are the plunger cross-sectional areas for plunger sections 16A, 16B and 16C, respectively, S is the stroke length of the intake and delivery strokes, and $DV_A$, $DV_B$ and $DV_C$ are the displacement volumes of chambers 14A, 14B and 14C, respectively.

Table 1 shows three non-limiting numerical examples of a multi-stage pump having three chambers 12 as shown in FIG. 1. The stroke length S for all three examples is 12.7 mm. At least one of the plunger section diameters $D_A$, $D_B$ and $D_C$ corresponding to plunger sections 16A, 16B and 16C, respectively, is different for each example. The table show the displacement volume $DV_A$, $DV_B$ and $DV_C$ for the three chambers 14A, 14B and 14C, respectively, which represent the volume of non-compressible fluid that can be delivered by an online chamber 14 during a pump stroke.

TABLE 1

|        | Example 1 | Example 2 | Example 3 |
|--------|-----------|-----------|-----------|
| S      | 12.7 mm   | 12.7 mm   | 12.7 mm   |
| $D_A$  | 2.00 mm   | 2.00 mm   | 2.00 mm   |
| $D_B$  | 3.96 mm   | 3.96 mm   | 3.18 mm   |
| $D_C$  | 4.76 mm   | 4.32 mm   | 4.76 mm   |
| $DV_A$ | 0.040 mL  | 0.040 mL  | 0.040 mL  |
| $DV_B$ | 0.117 mL  | 0.117 mL  | 0.061 mL  |
| $DV_C$ | 0.070 mL  | 0.029 mL  | 0.126 mL  |

There are seven possible online states in which at least one of the chambers 14 is active. These states are determined according to the configuration of the bypass valves 36 and result in seven possible flow rates that can be delivered by the pump for a fixed pump stroke frequency. The flow rate of fluid delivered by the pump is determined by the contributed volumes from the chambers 14 for which the corresponding bypass valve 36 is in an open state. It can be seen that the middle chamber 14B is capable of contributing the greatest fluid volume contribution in Examples 1 and 2 while the rightmost chamber 14C is capable of contributing the greatest volume contribution in Example 3.

Low Flow Rate Operation

Referring again to FIG. 1, the pumping system 10 is shown configured for a low flow rate operational mode in which only a single chamber 12A is online. For example, a low flow rate mode may be desired for a chromatography system used for small-scale analysis. In this mode, one bypass valve 36A is configured in an open state and the other bypass valves 36B and 36C are configured in a closed state. Arrows indicate the direction of fluid flow through the various flow paths. As the plunger is retracted (moved to the right), fluid is drawn into all three chambers 14. The volume of fluid present in each chamber is determined according the unoccupied volume of the chamber 14 that is, the difference between the volume of the chamber 14 less the volume of the plunger section 16 present in the chamber 14.

During the intake stroke, the inlet check valves 34 allow fluid to flow from the pump inlet channel 26 through the inlet channels 24 into the three chambers 14 while the outlet check valves 38 prevents fluid from flowing backwards from the pump outlet channel 30 through the outlet channels 28 into the chambers 14. Fluid also passes through closed check valves 36B and 36C into chambers 14B and 14C, respectively. After completion of the intake stroke, the direction of the linear motion of the plunger 16 is reversed to start a delivery stroke.

FIG. 2 shows the positive displacement pumping system 10 of FIG. 1 during the delivery stroke where the plunger 16 is moved toward the left in the figure. The inlet check valves 34 prevent flow of the fluid in a reverse direction toward the pump inlet channel 26; however, chambers 14B and 14C are still in direct fluid communication with the pump inlet channel 26 to allow for a backward flow because bypass valves 36B and 36C are in a closed state. Outlet check valve 38A is conducting during the delivery stroke and provides an active fluid path from the smallest chamber 14A. The high pressure in the pump outlet channel 30 developed by the small plunger section 16A results in maintaining the outlet check valves 38B and 38C in a non-conducting state. Since bypass valves 36B and 36C are in the closed state, no fluid is contributed to the output flow from pump stages 12B and 12C. Consequently, pump stage 12A is the only contributor to the high-pressure fluid flow from the multi-stage pump system 10. Thus, a low flow rate is achieved and the multi-stage pump system 10 performs similar to a single stage pump having a chamber and plunger with diameters similar to those of the smallest chamber 12A.

In the example described above, the delivered flow is due only to a contribution from chamber 14A. It should be noted that the chamber 14 associated with the smallest plunger section diameter does not necessarily contribute the smallest volume of fluid for a pump stroke. For example, it can be seen from Table 1 that the chamber 14C having the plunger section of greatest diameter contributes the least volume during a pump stroke.

Intermediate Flow Rate Operation

Figure 3:
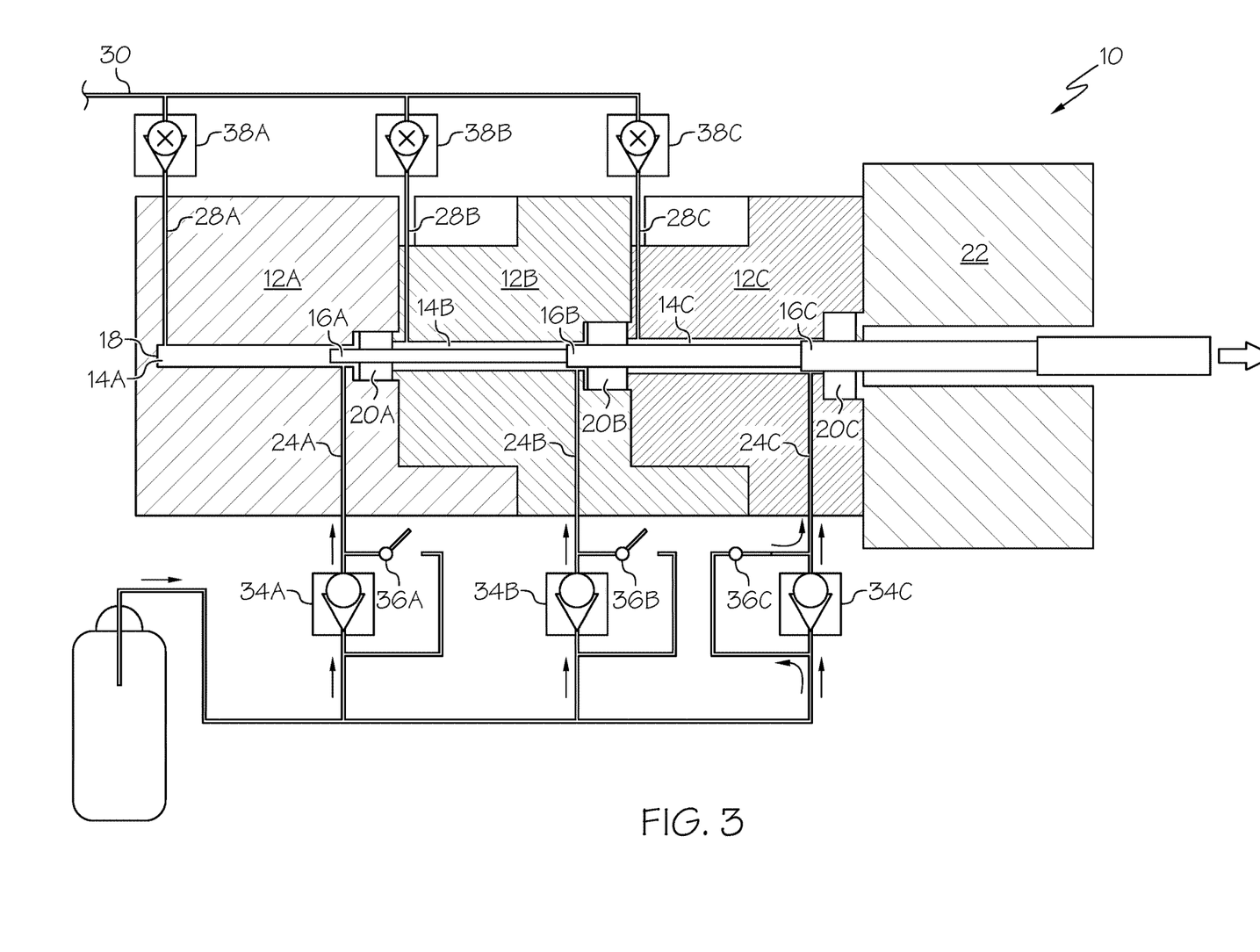
FIG. 3 shows the multi-stage pump of FIG. 1 configured for an intermediate flow rate operational mode during an intake stroke.

FIG. 3 depicts the pumping system 10 configured for an intermediate flow rate operational mode. Bypass valves 36A and 36B are configured in an open state and bypass valve 36C is configured in a closed state. As the plunger is retracted, the outlet check valves 38 are in a non-conducting state, preventing fluid flow through the outlet channels 28, while fluid is drawn into all three chambers 14 through the inlet check valves 34 and the closed bypass valve 36C.

Figure 4:
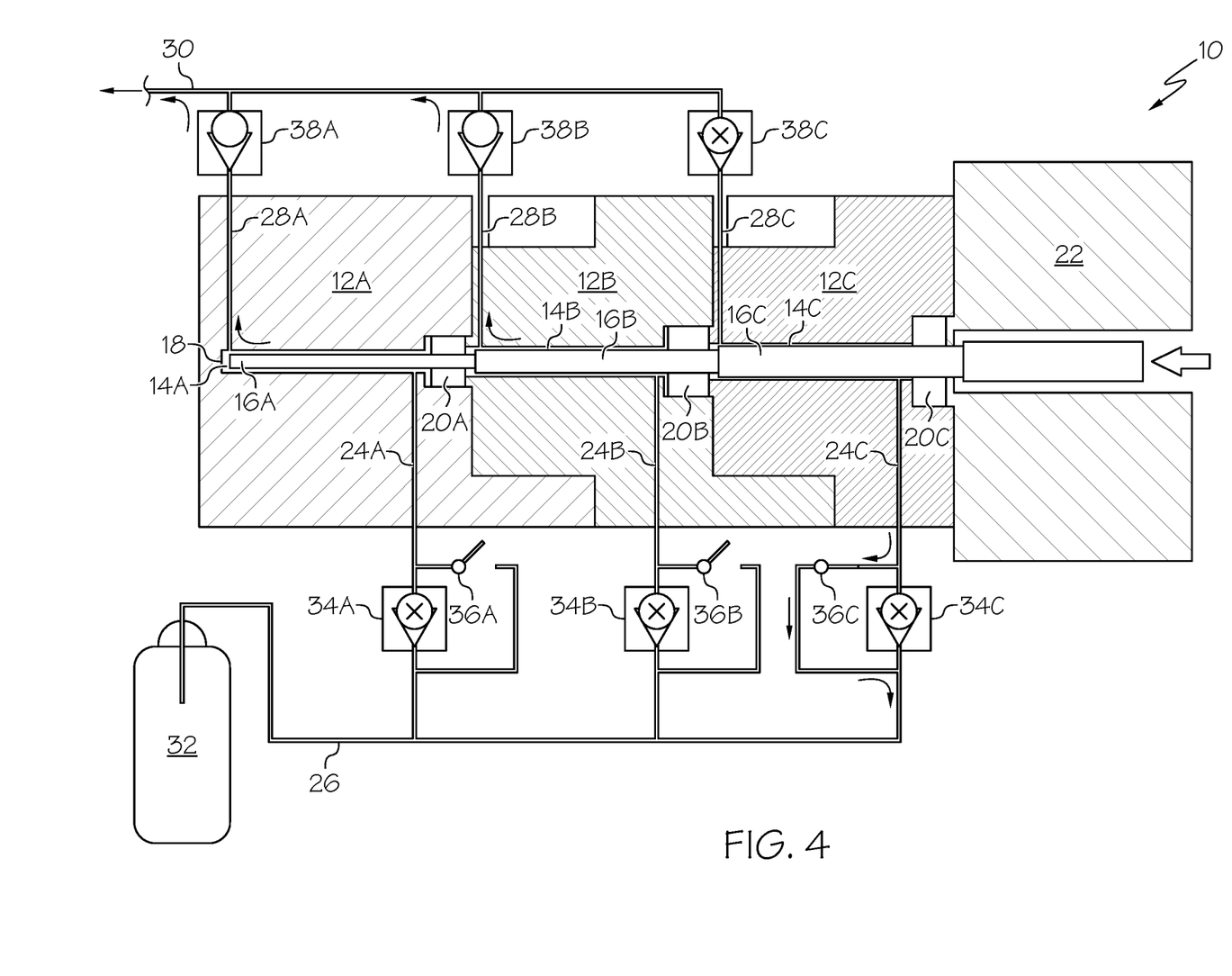
FIG. 4 shows the multi-stage pump of FIG. 3 during a delivery stroke.

FIG. 4 shows the pumping system 10 during a delivery stroke. The inlet check valves 34A and 34B prevent the reverse flow of fluid to the pump inlet channel 26 from chambers 14A and 14B; however, fluid flows backward to the pump inlet channel 26 from chamber 14C through closed bypass valve 36C. Outlet check valves 38A and 38B are in a conducting state due to the high pressure developed in their chambers 14A and 14B, respectively, while the third outlet check valve 38C is in a non-conducting state due to the higher pressure in the pump outlet channel 30 relative to the pressure of the largest chamber 14C. Consequently, pump stages 12A and 12B contribute to the high-pressure fluid flow from the multi-stage pump system 10. The pump flow rate is determined as the sum of the flow rates of the fluid delivered from the two smaller chambers 12A and 12B.

High Flow Rate Operation

Figure 5:
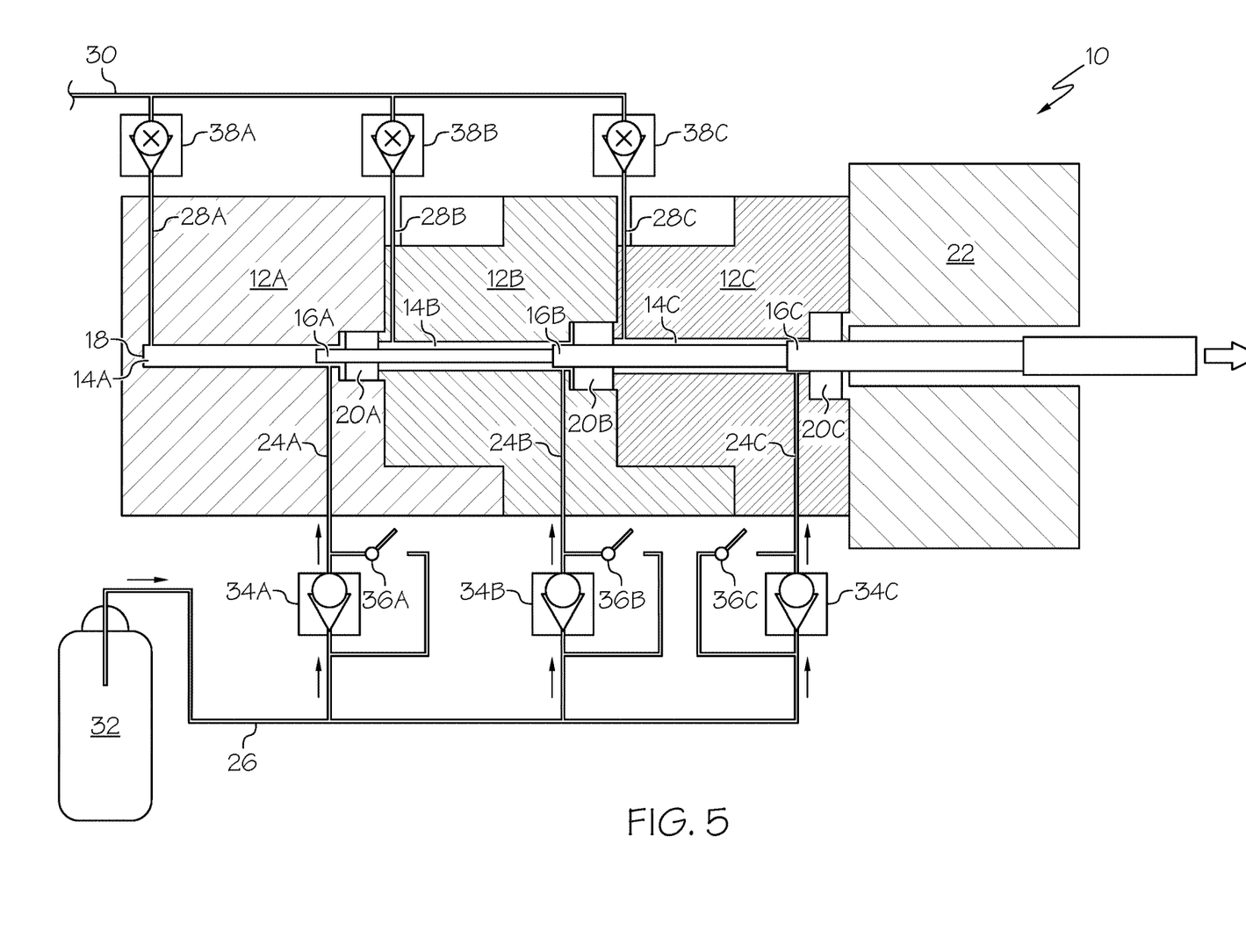
FIG. 5 shows the multi-stage pump of FIG. 1 configured for a high flow rate operational mode during an intake stroke.

FIG. 5 shows the pumping system 10 configured for a high flow rate operational mode in which all the bypass valves 36 are configured in an open state. For example, a high flow rate mode may be desired for a chromatography system used for large-scale analysis. As the plunger 16 is retracted, the outlet check valves 38 are in a non-conducting state, while fluid is drawn into all three chambers 14 through the conducting inlet check valves 34.

Figure 6:
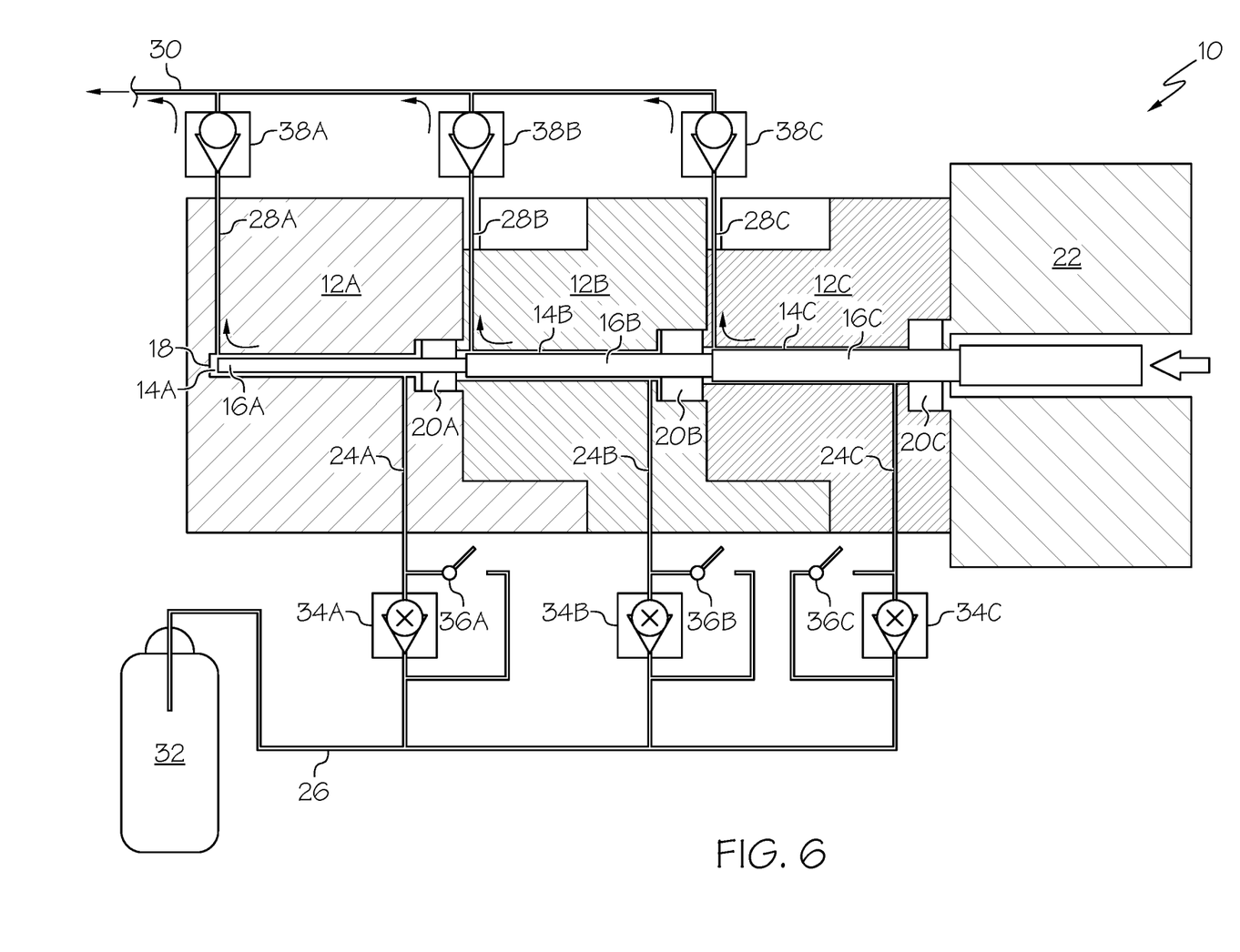
FIG. 6 shows the multi-stage pump of FIG. 5 during a delivery stroke.

FIG. 6 shows the pumping system 10 during a delivery stroke. The inlet check valves 34 and the open bypass valves 36 prevent the reverse flow of fluid to the pump inlet channel 26 from all three chambers 14. All three outlet check valves 38 conduct fluid due to the high pressure developed in all three chambers 14. As a result, all the pump stages 12 contribute to the high-pressure fluid flow from the multi-stage pump system 10 and the flow rate is the sum of the flow rates of the fluid delivered from all three chambers 14.

Other modes of operation of the multi-stage pump system 10 are possible. For example, the bypass valves 36 may be configured so that either the middle pump stage 12B or the largest pump stage 12C is the sole contributor of fluid flow from the multi-stage pump system 10. In another example of operational modes, pump stages 12A and 12C may contribute while pump stage 12B is not contributing. In another example, pump stages 12B and 12C may contribute while pump stage 12A does not contribute.

In the examples described above, the check valves are described as passive in that the pressure differential across a check valve determines its state. In alternative examples, the multi-stage pump system is configured so that one or more of the check valves are effectively replaced by a controllable valve having a remotely-controllable actuator to configure the valve in either a conducting or non-conducting state. A multi-stage pump system arranged in this manner can be quickly reconfigured to operate at a different flow rate within a wide range of flow rates.

Figure 7:
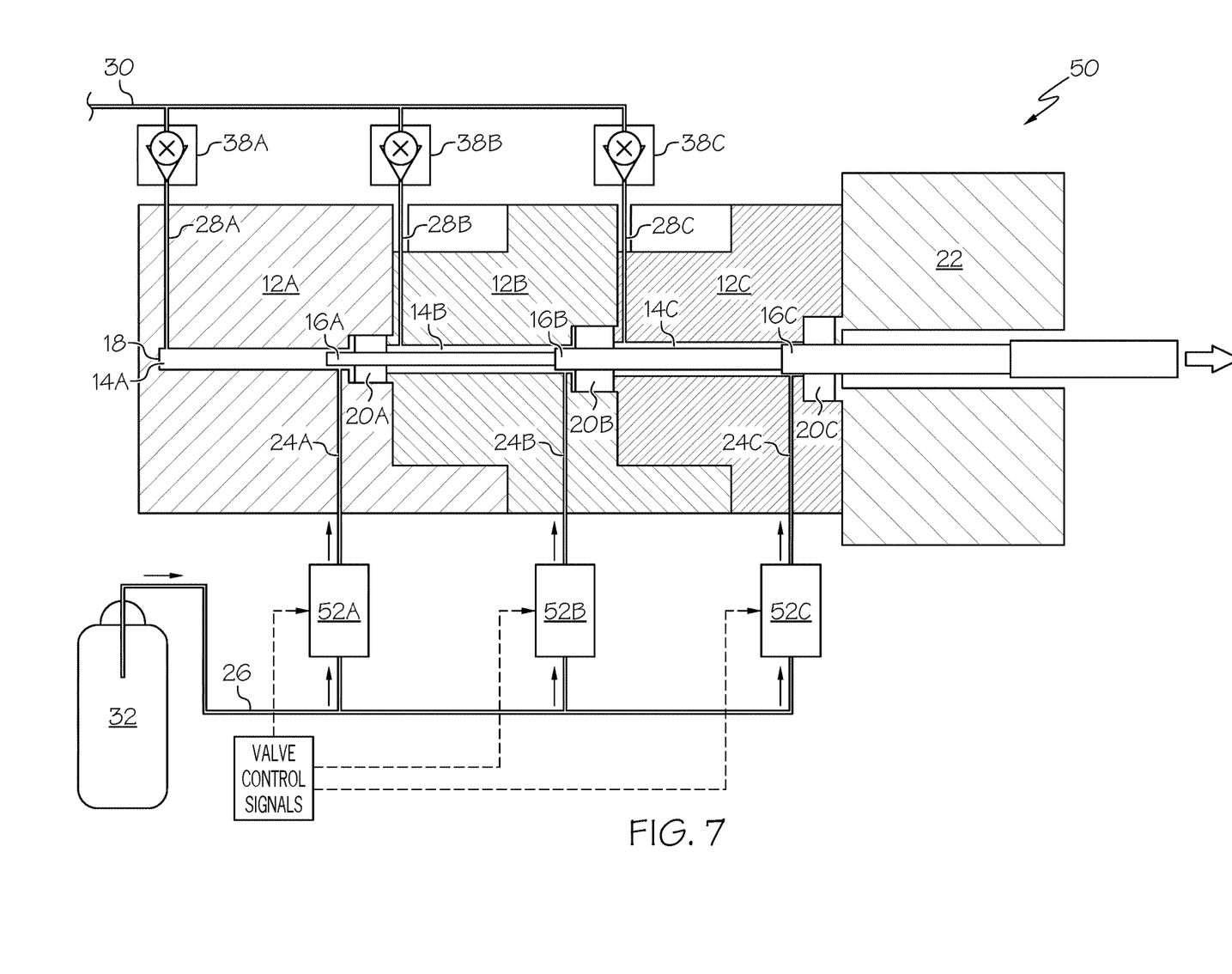
FIG. 7 shows an alternative example of a multi-stage pump having controllable inlet valves.

FIG. 7 shows an alternative multi-stage 50 system in which a single controllable inlet valve 52 replaces each parallel combination of an inlet check valve 34 and a bypass valve 36 (see FIG. 1). For example, the controllable inlet valve 52 may be a solenoid valve, a rotary valve, a voice coil actuator vale or another electromechanically operated valve. Each controllable valve 52 can be remotely actuated and de-actuated by a command signal (e.g., an electrical signal) from a control module to enable or prevent the flow of fluid. The control module determines the correct set of control signals according to the programmed operational mode. Advantageously, the multi-stage pump system can be quickly reconfigured for use in a different flow rate range without the need for an operator to manually configure bypass valves. Optionally, the outlet check valves 38 can similarly be replaced with controllable valves configured according to additional valve control signals.

Figure 8:
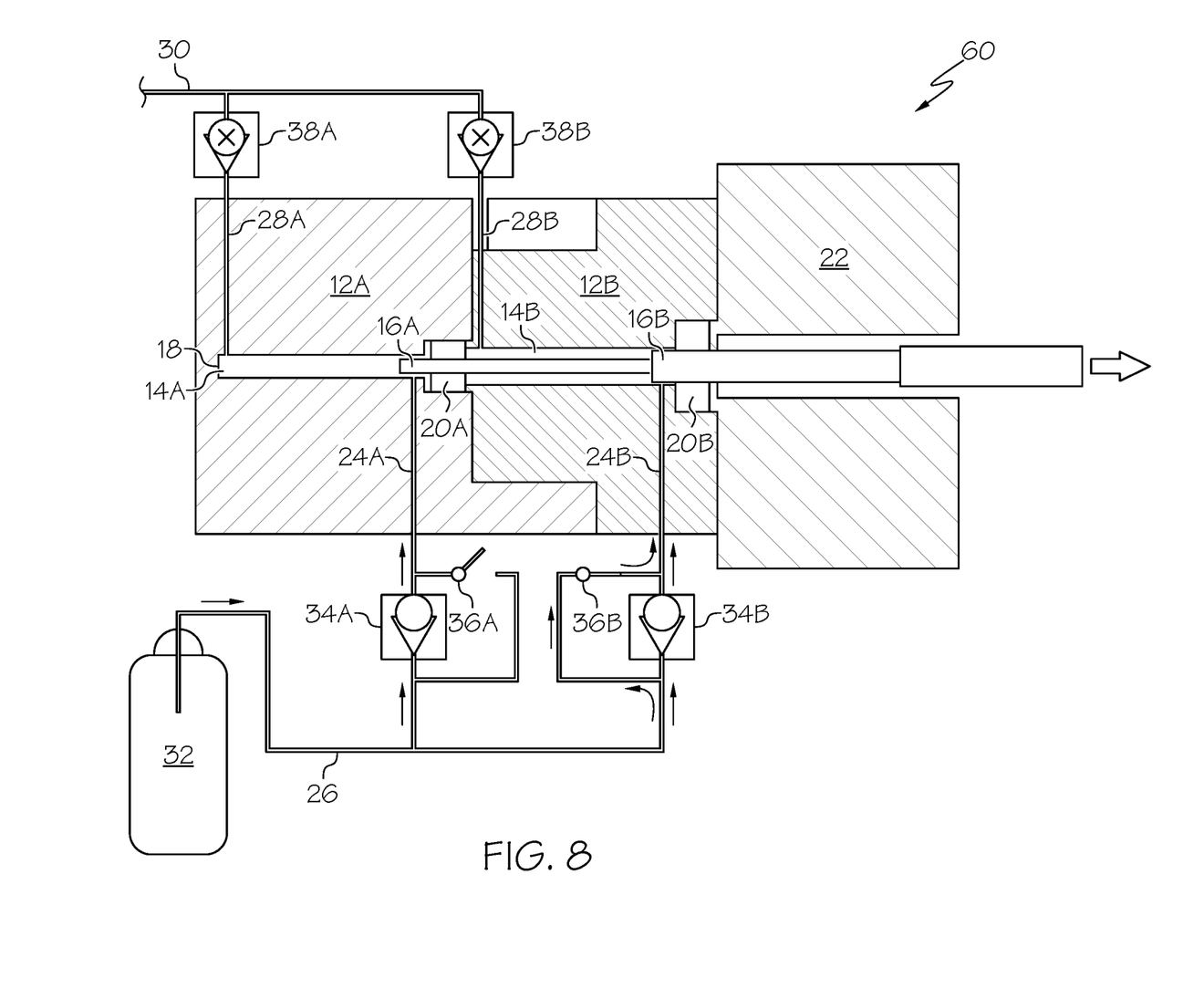
FIG. 8 shows another example of a multi-stage pump having two stages during an intake stroke.

In the examples described above, examples of the multi-stage pump are primarily described as having three stages. It should be emphasized that the multi-stage pump may include any plurality of stages. An example of a multi-stage pump 60 having two stages is shown in FIG. 8. In other examples, the multi-stage pump may have four or more stages.

While the technology has been shown and described with reference to specific embodiments, it should be understood by those skilled in the art that various changes in form and detail may be made therein without departing from the scope of the claims.

What is claimed is:

1. A multi-stage pump, comprising:
   a first pump stage having a first chamber having a first chamber diameter and a first chamber volume, the first pump stage further comprising a first inlet channel and a first outlet channel each in fluid communication with the first chamber;
   a second pump stage having a second chamber having a second chamber diameter and a second chamber volume, the first and second chambers being coaxial, the first chamber diameter and the first chamber volume being greater than the second chamber diameter and the second chamber volume, respectively, the second pump stage further comprising a second inlet channel and a second outlet channel each in fluid communication with the second chamber,
   wherein, for each of the first and second inlet channels, a parallel fluid path configuration of an inlet check valve and a bypass valve is disposed on the inlet channel and wherein the inlet check valve enables a forward flow of a liquid during an intake stroke and prevents a reverse flow of the liquid during a delivery stroke; and
   a plunger comprising:
      a first plunger section having a first plunger diameter, a first end configured for coupling to a drive mechanism, and a second end opposite to the first end, the first plunger section at least partially disposed in the first chamber; and
      a second plunger section having a second plunger diameter that is less than the first plunger diameter, a third end in contact with the second end of the first plunger, and a fourth end opposite to the third end, the second plunger section at least partially disposed in the second chamber, wherein a linear motion of the plunger produces a displacement volume for the first chamber that is different than a displacement volume produced for the second chamber.

2. The multi-stage pump of claim 1 wherein the first and second plunger sections are formed as a single integral plunger having the first plunger diameter along a first length and the second plunger diameter along a second length.

3. The multi-stage pump of claim 1 wherein the first and second plunger sections are discrete plunger sections.

4. The multi-stage pump of claim 1 further comprising a plunger spring disposed between the fourth end of the second plunger section and a closed end of the second chamber.

5. The multi-stage pump of claim 1 wherein, for at least one of the first and second chambers during the delivery stroke, the bypass valve for the chamber is in a closed state so that a reverse flow of the liquid passes through the bypass valve.

6. The multi-stage pump of claim 1 further comprising a check valve disposed in each of the outlet channels, wherein the check valve is configured to prevent a forward flow of a liquid through the check valve during an intake stroke and to enable the forward flow of the liquid through the check valve during a delivery stroke.

7. The multi-stage pump of claim 1 further comprising:
   at least one additional chamber, each of the additional chambers having a chamber diameter that is less than the first chamber diameter and the second chamber diameter, and different from the chamber diameter of any other one of the additional chambers, each of the additional chambers having a chamber volume that is less than the first chamber volume and the second chamber volume, and different from the chamber volume of the other additional chambers; and
   at least one additional plunger section, each one of the additional plunger sections having a plunger diameter that is less than the first and second plunger diameters, and is different from the plunger diameter of any of the other additional plunger sections.

8. The multi-stage pump of claim 1 wherein the bypass valves are remotely controllable, the multi-stage pump further comprising a control module in communication with each of the bypass valves to independently configure each of the bypass valves in one of an open state and a close state.

9. The multi-stage pump of claim 1 wherein the second plunger diameter does not exceed 2 mm.

10. The multi-stage pump of claim 1 wherein the first plunger diameter exceeds is approximately 10 mm.

11. A multi-stage pump, comprising:
   a first pump stage comprising a first chamber having a first chamber diameter and a first chamber volume, and a first inlet channel and a first outlet channel each in communication with the first chamber;
   a second pump stage comprising a second chamber having a second chamber diameter and a second chamber volume, and a second inlet channel and a second outlet channel each in communication with the second chamber, wherein the first and second chambers are coaxial, wherein, for each of the first and second inlet channels, a parallel fluid path configuration of an inlet check valve and a bypass valve is disposed in the respective inlet channel and wherein the inlet check valve enables a forward flow of a liquid during an intake stroke and prevents a reverse flow of the liquid during a delivery stroke; and a plunger comprising:
- a first plunger section having a first plunger diameter, a first end configured for coupling to a drive mechanism, and a second end opposite to the first end, the first plunger section at least partially disposed in the first chamber; and
- a second plunger section having a second plunger diameter that is less than the first plunger diameter, a third end in contact with the second end of the first plunger, and a fourth end opposite to the third end, the second plunger section at least partially disposed in the second chamber, wherein a linear motion of the plunger produces a displacement volume for the first chamber that is different than a displacement volume produced for the second chamber.

12. The multi-stage pump of claim 11 further comprising a check valve disposed in each of the first and second outlet channels, wherein the check valve is configured to prevent a forward flow of a liquid through the check valve during an intake stroke and to enable the forward flow of the liquid through the check valve during a delivery stroke.

* * * * *

UNITED STATES PATENT AND TRADEMARK OFFICE
CERTIFICATE OF CORRECTION

| | |
|---|---|
| PATENT NO. | : 11,181,103 B2 |
| APPLICATION NO. | : 16/444180 |
| DATED | : November 23, 2021 |
| INVENTOR(S) | : Wade P. Leveille et al. |

It is certified that error appears in the above-identified patent and that said Letters Patent is hereby corrected as shown below:

In the Claims

Column 10, Line 59 (Claim 10):
Please delete the word "exceeds" from the phrase "plunger diameter exceeds".

Signed and Sealed this
Fourteenth Day of March, 2023

Katherine Kelly Vidal
*Director of the United States Patent and Trademark Office*